US005910349A

United States Patent [19]
Tsukuda

[11] Patent Number: 5,910,349

[45] Date of Patent: Jun. 8, 1999

[54] DISPLAY LABEL AND METHOD OF PRODUCING SAME

[75] Inventor: Hiroshi Tsukuda, Kanagawa, Japan

[73] Assignee: Sony Corporation, Japan

[21] Appl. No.: 08/839,308

[22] Filed: Apr. 18, 1997

[30] Foreign Application Priority Data

Apr. 22, 1996 [JP] Japan .................................... 8-100233

[51] Int. Cl.[6] ........................................................ B32B 7/06

[52] U.S. Cl. ........................... 428/42.3; 428/77; 428/212; 283/81

[58] Field of Search ............................ 428/42.3, 77, 212; 283/81

[56] References Cited

U.S. PATENT DOCUMENTS

| | | | |
|---|---|---|---|
| 4,589,685 | 5/1986 | Lazar | 283/81 |
| 5,195,265 | 3/1993 | Klingenberg | 40/638 |
| 5,597,634 | 1/1997 | Bloomer et al. | 428/42.3 |
| 5,736,210 | 4/1998 | Treleaven | 428/40.1 |

FOREIGN PATENT DOCUMENTS

| | | |
|---|---|---|
| 2.038.799 | 1/1971 | France . |
| 61-187090 | 11/1986 | Japan . |
| 3-504054 | 9/1991 | Japan . |
| WO95/32492 | 11/1995 | WIPO . |

*Primary Examiner*—Alexander Thomas
*Attorney, Agent, or Firm*—Ronald P. Kananen; Rader, Fishman & Grauer

[57] ABSTRACT

A display label for displaying recorded contents to be adhered to a housing accommodating an audio, video, data, or other information recording medium, comprising a release sheet having a silicone-based coating on one surface, a first base (mount sheet) label member, on the coating surface, having an area commensurate with an adhesion surface of the housing and having an adhesive agent on one surface; a second label member, laminated on the first base label member, which is smaller than the first base label member when the ends are aligned, which can be divided into a plurality of pieces, and which has an adhesive agent on one surface; a third label member, laminated on the second label member, composed of a plurality of pieces which are smaller than the pieces of the second base label when the ends are aligned and which has an adhesive agent on one surface, and any freely determined fourth to n-th label members, laminated in the same way as the third label member, comprised of a plurality of pieces which are smaller than the pieces of the lower layer labels when the ends are aligned.

2 Claims, 3 Drawing Sheets

DISPLAY LABEL AND METHOD OF PRODUCING SAME

BACKGROUND OF THE INVENTION

1. Field of the Invention

The present invention relates to a display label to be adhered to a cartridge etc. in which an information recording medium such as a magnetic recording use tape is accommodated, more particularly relates to a display label formed by lamination of a plurality of label members.

2. Description of the Related Art

In general, a cartridge of a tape cassette etc. in which an information recording medium is accommodated has a label area for adhering a display label formed at the predetermined position. By adhering the display label, on which the recorded content, title, etc. are written, on this label area, it becomes possible to visually confirm and determine the content recorded on the accommodated information recording medium from the cartridge.

When a cartridge in which is accommodated an information recording medium on which specific information data has been already recorded and on the label area of which a display label on which the recorded content etc. are written is adhered is changed in the content recorded on the information recording medium as a result of new recording of the information data, it becomes necessary to change the content described on this display label. Usually, in such a case, this is done by attempting to peel off the old display label and adhering an updated display label on the cartridge, but there is the problem that sometimes one can not find where the new display labels are stored when looking for a new label.

One method used to solve this problem of replacement of display labels in the past was to adhere to the cartridge a display composed of a plurality of label members laminated with each other in a peelable state. For example, Japanese Unexamined Utility Model Publication No. 61-187090 "Memory Label Member for Cassette Tape" discloses a display label composed of a plurality of label members laminated with successively shorter edges in the longitudinal direction so that these label members can be successively peeled off.

Further, Japanese Unexamined Patent Publication No. 3-504054 "Labeling Method" discloses a display label which includes a plurality of laminated label members and facilitates the grip when peeling off a label member by providing each of these label members with a portion not coated with an adhesive on one end in the longitudinal direction.

By using these display labels, when it became necessary to change the content described on a label member, a new label member of the layer underneath it was exposed by peeling off the label member of the uppermost layer on which the title etc. had been already described. Therefore, the process of finding a new display label and the process of adhering the new display label can be eliminated and the above problem accompanying the replacement of a display label can be solved.

In actual use, however, in many cases the information recording medium inside the cartridge will contain several different items and therefore the display label usually will have several different titles etc. written on it corresponding to the same. In such a case, when where there is only a partial change of the recorded content, it is sometimes sufficient to rewrite just one title among the plurality of titles on the display label.

With a conventional display label or one of the above display labels comprising a plurality of laminated label members, peeling off the display label or peeling off one label member means peeling off the display label or label member on which all of the titles are displayed. Therefore, with these display labels, even in a case where only one title need be rewritten, it becomes necessary to rewrite even the titles which did not originally have to be rewritten on the newly adhered display label or newly exposed label member. Therefore, there arose the inconvenience that much work was required for this rewriting.

Further, in one of the above display labels comprising a plurality of laminated label members, as mentioned above, when there was a change in all or part of the recorded contents and the titles and other information labeled had to be changed, the label member of the uppermost layer on which the title etc. had been written was peeled off to expose a new label member of the layer beneath the same. At this time, however, there was the concern that a label member of the layer below the label member of the uppermost layer which was peeled off, particularly the label member of the lowermost layer directly adhered to the cartridge, would be peeled off together.

Further, in one of the above display labels comprising a plurality of laminated label members, in the usual state of adhesion to the label area etc. of the cartridge, the lamination state thereof, that is, how many individual label members were laminated and how many times the title etc. could be rewritten in the future could not be discerned in certain cases.

For example, the above Japanese Unexamined Utility Model Publication No. 61-187090 "Memory Label for Cassette Tape" discloses in FIG. 1 thereof a display label formed by the lamination of a plurality of memory labels having the same size as each other. With such a display label, the state of lamination of the individual memory labels cannot be determined in the usual state of use shown in FIG. 5.

On the other hand, FIG. 6 of the same publication shows a display label composed of individual memory labels of successively smaller lengths in the longitudinal direction according to the order of lamination so that one end of the memory labels in the longitudinal direction is exposed. In such a display label, however, if the individual memory labels have the same color as each other, the state of lamination thereof can only be discerned by carefully examining or touching the same. Accordingly, with such a display label, in the above usual state of us where the cartridge is accommodated in a rack or the like and where it is viewed from a position a certain distance away, it is extremely difficult to visually confirm the state of lamination.

SUMMARY OF THE INVENTION

An object of the present invention is to solve these problems in the related art and provide a display label which enables a change of even part of the titles when a plurality of titles are described.

Another object of the present invention is to provide a method of production enable the display label described above to be easily produced.

To achieve the above first object, the present invention provides a multiple layer display label for displaying recorded contents to be adhered to a housing accommodating an audio, video, data, or other information recording medium, comprising a release sheet having a silicone-based coating on one surface, a first base (mount sheet) label member, on the coating surface, having an area commensurate with an adhesion surface of the housing and having an adhesive agent on one surface; a second label member, laminated on the first base label member, which is smaller than the first base label member when the ends are aligned, which can be divided into a plurality of pieces, and which has an adhesive agent on one surface; a third label member, laminated on the second label member, composed of a plurality of pieces which are smaller than the pieces of the second base label when the ends are aligned and which has an adhesive agent on one surface, and any freely determined fourth to n-th label members, laminated in the same way as the third label member, composed of a plurality of pieces which are smaller than the pieces of the lower layer labels when the ends are aligned.

Preferably, the adhesive agents coated on the surfaces of the first and later label members have peeling strengths per unit area which are gradually smaller from the lower layer label members toward the upper layer label members.

Preferably, the stepwise exposed ends of the first label member and later label members are made colors different from each other at least between adjoining upper and lower layers.

According to the display label of the present invention constituted as described above, since the other label members are divided into a plurality of label pieces, by writing the individual titles on these label pieces, it becomes possible to display a plurality of contents in a manner by which when part of the recorded contents is changed, the label piece for the corresponding title can be peeled off to expose a new label piece of the label member of the lower layer or the first label member. Therefore it is sufficient to write just the title for the new recorded content on this exposed new label piece or the first label member and there is no need to rewrite the other titles.

To achieve the second object, the present invention provides a method for producing a multiple layer display label, comprising a laminate feeding step of feeding a long laminate composed of a sheet material for forming a first label member laminated on a release material and a plurality of sheet materials to be laminated on this sheet material for forming other label members; a label shape punching step for punching this laminate into predetermined flat shapes to form a display label portion; a blank sheet removing step for removing the blank parts of the laminate; a label sheet dividing step for dividing the the sheet materials for forming the other label members of the display label portion formed by the label shape punching step into a plurality of label pieces of an equal number and substantially equal shape but smaller area than the label pieces of the layers directly under the same; and a label scrap removing step for removing the label scraps from the plurality of label pieces of the other label members formed by the label sheet dividing step in a state where the side surfaces of the label scraps are not in contact with the side surfaces of the label pieces on the two sides thereof by bending the sheet materials to a predetermined shape via a guide member.

BRIEF DESCRIPTION OF THE DRAWINGS

These and other objects and features of the present invention will become clearer from the following description of the preferred embodiments given with reference to the accompanying drawings, in which.

DETAILED DESCRIPTION OF THE PREFERRED EMBODIMENTS

Figure 1:
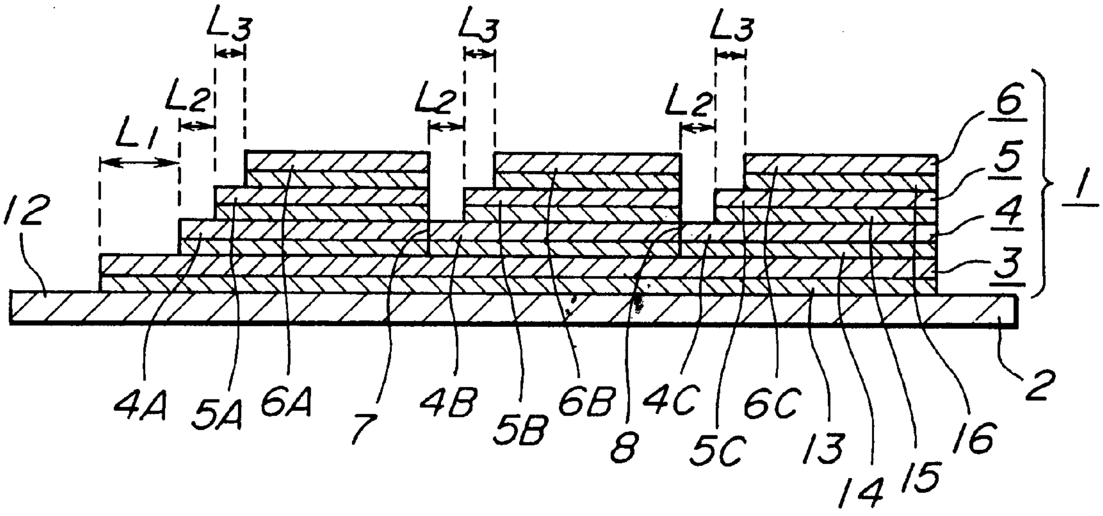
FIG. 1 is a sectional view of a display label according to the present invention.

Below, a detailed explanation will be made of an embodiment of the display label according to the present invention by referring to the drawings. As shown in FIG. 1, this display label 1 is constituted by a mount sheet label member 3 laminated on one surface of a release sheet 2 and three laminated divided label members 4, 5, and 6. In this embodiment, the number of the laminated divided label members is set as three layers of a first laminated divided label member 4, a second laminated divided label member 5, and a third laminated divided label member 6. These layers constitute the top three layers of the four-layer display label 1. Note that the display label 1 uses cardboard paper made of the generally used high grade paper as the material for the label members 3 through 6 constituting these layers.

The release sheet 2 exhibits a long rectangular shape which has a longer length than the label members. One surface is a silicone-coated surface 12 subjected to silicone coating. The mount sheet label member 3 is adhered to the silicone coating surface 12 of this release sheet 2.

This mount sheet label member 3 exhibits a long rectangular shape which is slightly shorter than the release sheet 2 in the longitudinal direction. Further, the back surface of the mount sheet label member 3 forms an adhesion surface coated with a first adhesive agent 13. This adhesion surface is adhered onto the silicone-coated surface 12 of the release sheet 2 in an easily peelable manner. The first adhesive agent 13 contains for example a styrene-based resin and is adjusted so that the peeling strength when peeling up the first mount sheet label member 3 of a length of 19 mm perpendicularly from an adhesion surface of substantially 8 $\mu mR_z$ by a tensile strength of about 2 cm/s becomes about 300 g. The surface of the mount sheet label member 3 is white. The first laminated divided label member 4 is adhered to this surface with one of the ends in the longitudinal direction aligned with one of its ends.

This first laminated divided label member 4 is formed with a width equal to the mount sheet label member 3 and a length shorter than the latter by exactly the amount $L_1$. Accordingly, in the display label 1, exactly the amount $L_1$ worth of the white color surface of the mount sheet label member 3 is exposed. The surface of the first laminated divided label member 4 is colored pink. Further, the back surface of the first laminated divided label member 4 forms an adhesion surface coated with a second adhesive agent 14. The adhesion surface is adhered to the surface of the mount sheet label member 3. The peeling strength of the second adhesive agent 14 is set weaker than that of the first adhesive agent 13 so that only the first laminated divided label member 4 is peeled off without together peeling off the mount sheet label member 3 of the lowermost layer when peeling off the first laminated divided label member 4. For example, the second adhesive agent 14 is formed so that the peeling strength becomes about 50 to 200 g when measured by a method similar to that for the first adhesive agent 13.

In the first laminated divided label member 4, cuts 7 and 8 are formed in the widthwise direction thereof to enable it to be divided into three label pieces 4A, 4B, and 4C exhibiting shapes equal to each other. Pieces of the second laminated divided label member 5 are adhered to the surfaces of the label pieces 4A, 4B, and 4C of this first laminated divided label member 4.

The second laminated divided label member 5 is composed of three label pieces 5A, 5B, and 5C having equal shapes corresponding to the label pieces 4A, 4B, and 4C of the first laminated divided label member 4. The label pieces 5A, 5B, and 5C are formed with widths equal to those of the label pieces 4A, 4B, and 4C of the first laminated divided label member 4 and lengths shorter than the latter by exactly the amount of $L_2$. The label piece 5A of the second laminated divided label member 5 is laminated on the surface of the label piece 4A of the first laminated divided label member 4 with one end aligned with the cut 7.

The label piece 5B of the second laminated divided label member 5 is laminated on the surface of the label piece 4B of the first laminated divided label member 4 with one end aligned with the cut 8. Further, the label piece 5C of the second laminated divided label member 5 is laminated on the surface of the label piece 4C with one end aligned with the end portion formed by the ends of the mount sheet label member 3 and the label piece 4C of the first laminated divided label member 4. Due to this, in the display label 1, the pink color surfaces of the label pieces 4A, 4B, and 4C of the first laminated divided label member 4 are exposed from ends of the pieces of the second laminated divided label member 5 by exactly the amounts $L_2$.

The surface of the second laminated divided label member 5 is colored blue. Further, the back surface of the second laminated divided label member 5 forms an adhesion surface coated with a third adhesive agent 15. This adhesion surface is adhered to the surface of the first laminated divided label member 4. The peeling strength of the third adhesive agent 15 is set weaker than those of the first adhesive agent 13 and the second adhesive agent 14 so that when peeling off the second laminated divided label member 5, only the second laminated divided label member 5 is peeled off without together peeling off the mount sheet label member 3 of the lowermost layer and the first laminated divided label member 4. The third laminated divided label member 6 is adhered to the surface of this second laminated divided label member 5.

The third laminated divided label member 6 is composed of label pieces 6A, 6B, and 6C having equal shapes corresponding to the label pieces 5A, 5B, and 5C of the second laminated divided label member 5. The label pieces 6A, 6B, and 6C are formed with widths equal to those of the label pieces 5A, 5B, and 5C of the second laminated divided label member 5 and with lengths shorter than the latter by exactly an amount of $L_3$. The label piece 6A of the third laminated divided label member 6 is laminated on the surface of the label piece 5A with one end aligned with the end of the label piece 5A aligned with the cut 7.

Also, the label piece 6B of the third laminated divided label member 6 is laminated on the surface of the label piece 5B with one end aligned with the end of the label piece 5B aligned with the cut 8. Further, the label piece 6C of the third laminated divided label member 6 is laminated on the surface of the label piece 5C with one end aligned with the end portion formed by the ends of the mount sheet label member 3, the label piece 4C, and the label piece 5C. Due to this, in the display label 1, the blue color surfaces of the label pieces 5A, 5B, and 5C of the first laminated divided label member 5 are exposed from ends of the pieces of the third laminated divided label member 6 by exactly the amount of $L_3$. Also, in the display label 1, due to the above lamination, the end portions of the mount sheet label member 3 and the label pieces of the laminated divided label members 4, 5, and 6 form steps as a whole.

The surface of the third laminated divided label member 6 is colored gray. Further, the back surface of the second laminated divided label member 5 forms an adhesion surface coated with a fourth adhesive agent 16. This adhesion surface is adhered to the surface of the second laminated divided label member 5. The peeling strength of the fourth adhesive agent 16 is set weaker than those of the first adhesive agent 13, the second adhesive agent 14, and the third adhesive agent 15 so that when peeling off the third laminated divided label member 5, only the third laminated divided label member 6 is peeled off without together peeling off the mount sheet label member 3 of the lowermost layer, the first laminated divided label member 4, and the second laminated divided label member 5. The third laminated divided label member 6 is adhered to the surface of this second laminated divided label member 5.

While the display label 1 described above was constituted by four layers, in the present invention it is sufficient so far as there are at least two layers. That is, the number of the layers is not particularly limited. Accordingly, in the present invention, it is also possible to adopt a structure in which the second laminated divided label member 5 and/or third laminated divided label member 6 is omitted and a structure in which, conversely, one or more laminated divided label members are further laminated on the surface of the third laminated divided label member 6.

Further, while the above display label 1 was constituted by dividing the laminated divided label members 4, 5, and 6 into three in the longitudinal direction, in the present invention, the laminated divided label members 4, 5, and 6 may be divided to two or four or more. That is, the number of pieces divided into is not particularly limited. Further, while the above display label 1 was constituted by dividing the laminated divided label members 4, 5, and 6 in the longitudinal direction, the division is not limited to this in the present invention. A structure dividing the members in the width direction or a structure dividing them in both of the longitudinal direction and width direction can be adopted as well.

Figure 2:
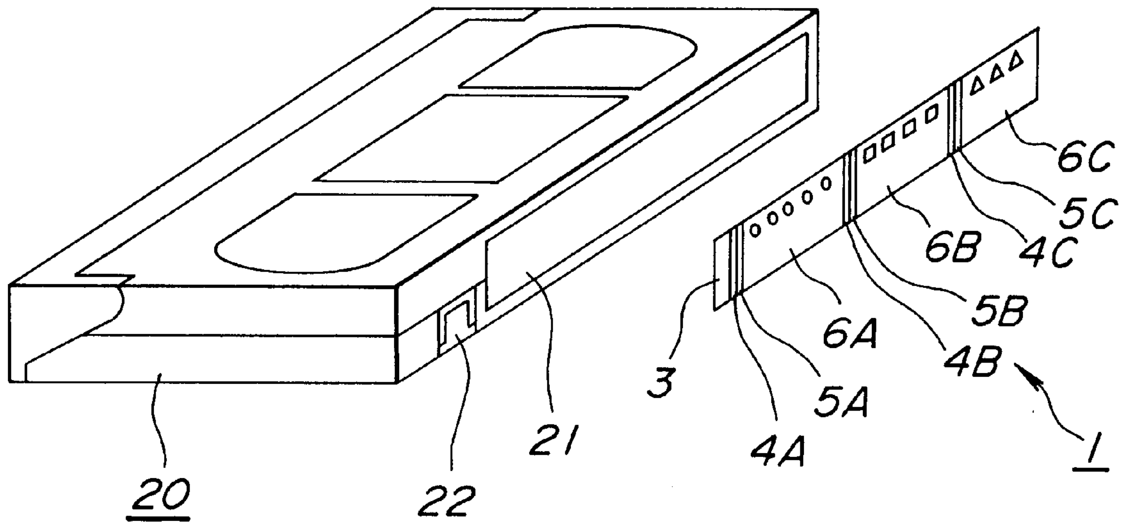
FIG. 2 is an explanatory view of use where the same display label is adhered to a label area of a video tape cassette.

This display label 1 is used adhered to a label area 21 formed on the back surface of a video tape cassette 20 in which the video tape is accommodated as shown in for example FIG. 2. Where adhering the display label 1 to the label area 21, the mount sheet label member 3 is peeled off from the release sheet 2 starting for example from the left end of the mount sheet label member 3 shown in FIG. 2 getting a hold by a fingernail, positioned with its adhesion surface facing the label area 21, and pressing the adhesion surface against the label area 21.

The display label 1 first has the recorded content, titles, etc. written on the label pieces 6A, 6B, and 6C of the third laminated divided label member 6 in accordance with the recorded content of the video tape. When part of the recorded content is changed by new recording onto the video tape and it becomes necessary to change the information written on one of the label pieces 6A, 6B, and 6C of the display label 1, only the corresponding label piece is peeled off.

By this, a label piece of the second laminated divided label member 5 is exposed in the display label 1. The title etc. of the newly recorded content is then written on this label piece. Since the label pieces on which the other titles are written are left as they are as a result, the process of rewriting the titles for the already existing recorded content as in a conventional display label is eliminated.

Note that, in the display label 1, when peeling off a label piece, by peeling off the label piece from the end on the side where part of the label of the layer immediately below the same is exposed, the label piece can be peeled off without together grasping the label piece of the layer immediately below and while pushing the label piece of the layer immediately below, so the label piece of the layer immediately below is prevented from being peeled off together.

Further, in the display label 1, since the relationship of the peeling strengths per unit area for the adhesive agents 13, 14, 15, and 16 coated on the adhesion surfaces of the mount sheet label member 3 and the laminated divided label members 4, 5, and 6 becomes the first adhesive agent 13>second adhesive agent 14>third adhesive agent 15>fourth adhesive agent 16, even if the label pieces are peeled off relatively uncarefully, the label pieces of the lower layers or the mount sheet label member 3 will not be peeled off together.

Further, in the display label 1, since the surface is given a different color for each of the label members 3, 4, 5, and 6 constituting the layers and part or all of the surface is exposed to the outside for every label piece, the position of the end of each label piece becomes clear and the position at which one should peel back each label piece by a fingernail can be seen at a single glance.

Further, in the display label 1, since the surface is given a different color for each of the label members 3, 4, 5, and 6 constituting the layers and part or all of the surface is exposed to the outside for every label piece, the state of lamination of each label piece can be visually confirmed even from a position a certain distance away. Accordingly, even in a case where the video tape cassette 20 is accommodated in a rack or the like and where it is placed at a positive relatively far away, it can be confirmed at a glance how many label pieces are laminated for the display label 1 and how many number of times the titles can be still rewritten.

Note that, in the above display label 1, all of the surfaces of the mount sheet label member 3 and the laminated divided label members 4, 5, and 6 were given different colors, but it is not necessary to make the color of the surface of the label different for every layer. In the display label 1, it is also possible to make for example the surface of the third laminated divided label member 6 the same white color as that of the surface of the mount sheet label 3. Namely, in the present invention, it is sufficient so far as the adjoining surfaces of the label pieces have different colors from each other.

Further, while the display label 1 described above was colored over the entire surfaces of the mount sheet label member 3 and the laminated divided label members 4, 5, and 6, but it is satisfactory so far as the end portions in the label pieces and mount sheet label member 3 exposed to the outside are colored different from each other between adjoining upper and lower layers. Accordingly, in the present invention, there is no limitation concerning the color for the parts other than the end portions exposed to the outside, therefore of course the color can be made the same as each other.

Further, in the above display label 1, the surfaces of the mount sheet label member 3 and the laminated divided label members 4, 5, and 6 were set as white, pink, blue, and gray, respectively, but the present invention needless to say is not limited to these colors. It is possible to make then yellow, green, orange, etc. Further, in the above display label 1, each of the surfaces of the mount sheet label member 3 and the laminated divided label members 4, 5, and 6 were made a single color, but the present invention is not limited to single color members. It is also possible to form a pattern, for example polka dots or meshes.

Further, in the above display label 1, the colors of the label pieces in each of the layers of the laminated divided label members 4, 5, and 6 were made the same, but the present invention is not limited to single colors for the label pieces of each layer. For example, the label pieces 6A, 6B, and 6C can be formed by colors and patterns different from each other too.

In this way, various types of labels as in the display label 1 can be produced by applying various colors and patterns to the labels and they can be used in various ways in accordance with the purpose of each user. For example, it becomes possible for the user to select the color and pattern of the display label 1 to express the significance and type of the recorded contents, for example, exposing a label piece of the red color when the anti-erasure tab 22 of the video tape cassette 20 is removed.

Note that, in this embodiment, the display label 1 was described as used for a video tape cassette 20, but the present invention is not limited to this use. The display label 1 can be used as the display label of all types of tape cassettes, for example, a compact tape cassette or a DAT cassette. Further, of course, it is also possible to use the display label 1 by adhering the same to not only a tape cassette, but also a case in which a tape cassette is accommodated or to a display sheet or the like accommodated in this case for writing detailed contents.

Further, in the above display label 1, since the laminated divided label members 4, 5, and 6 were divided into three in the longitudinal direction, when recording for only one theme etc. or when just one or two label pieces for writing the titles is sufficient and there are label piece with nothing written on them, it is also possible to use the same in place of tag paper, for example, peeling off the label pieces with nothing written on them and writing a message or memo on the same for adhering to a document etc. Furthermore, the display label 1 is not limited to use for information recording medium. It can be used adhered to all types of media, for example, pocketbooks, calenders, memo books, or notebooks.

Next, a detailed explanation will be made of the method of producing the display label 1 mentioned above by referring to FIG. 3 through FIG. 6.

Figure 3:
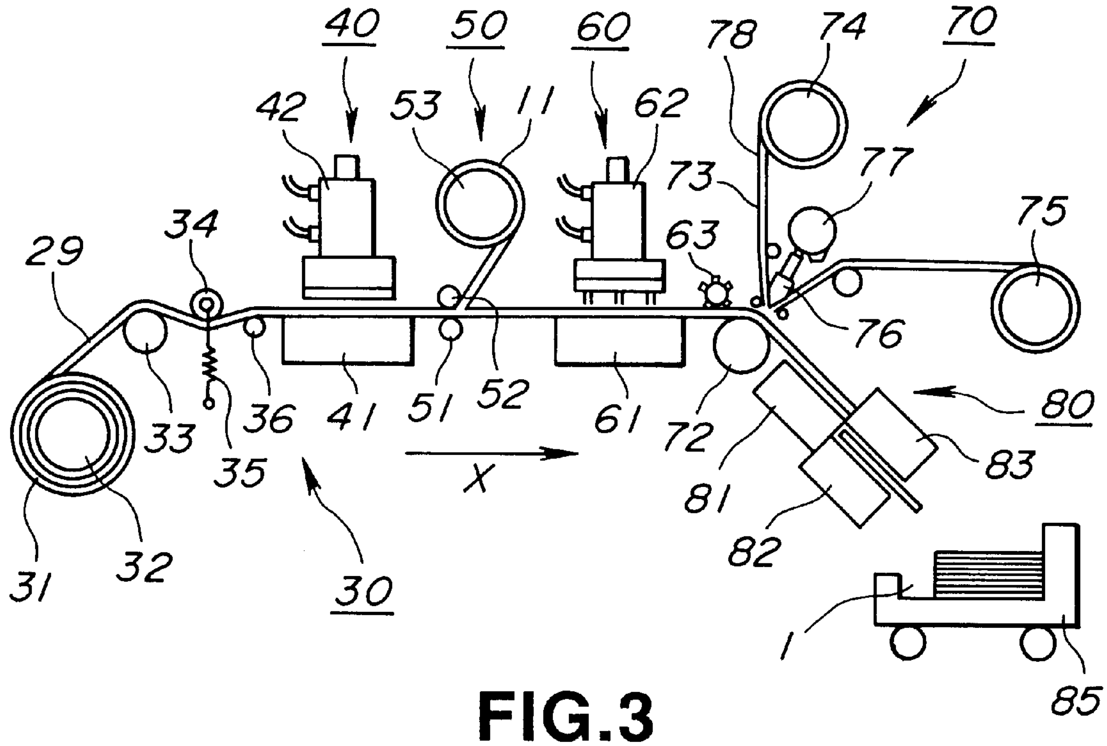
FIG. 3 is a view of the configuration of a display label producing machine for producing the display label.

The display label 1 is produced by a display label producing machine 30 provided with, for example, as shown in FIG. 3, a label shape punching mechanism 40, a blank sheet take-up mechanism 50, a label sheet division mechanism 60, a label scrap removing mechanism 70, and a release sheet cutting mechanism 80. In this display label producing machine 30, a laminate roll 31 around which a long laminate 29 is wound is fed in the X-direction of FIG. 3 by rollers provided at predetermined positions between the mechanisms to thereby form a feed line. The laminate 29 is formed into the predetermined shape by the above mechanisms disposed along this feed line, whereby the display label 1 is produced. Note that, the laminate 29 is composed of the label sheet materials for forming the mount sheet label member 3 and the laminated divided label members 4, 5, and 6 laminated on a release sheet 2.

In the display label producing machine 30, the laminate 29 is sent from the laminate roll 31 attached to the laminate roll roller 32 to the label shape punching mechanism 40 via a laminate feed roller 33, a guide roller 36, and a tension roller 34 biased by a tension spring 35. This label shape punching mechanism 40 is provided with a base stand 41 and a first punch 42. The laminate 29 sent to the base stand 41 is punched by the punch 42. This first punch 42 is numerically controlled for the proper depth of the punching so that the label sheet material up to the mount sheet label member 3 is punched but the punching is not performed up to the release sheet 2.

Figure 4:
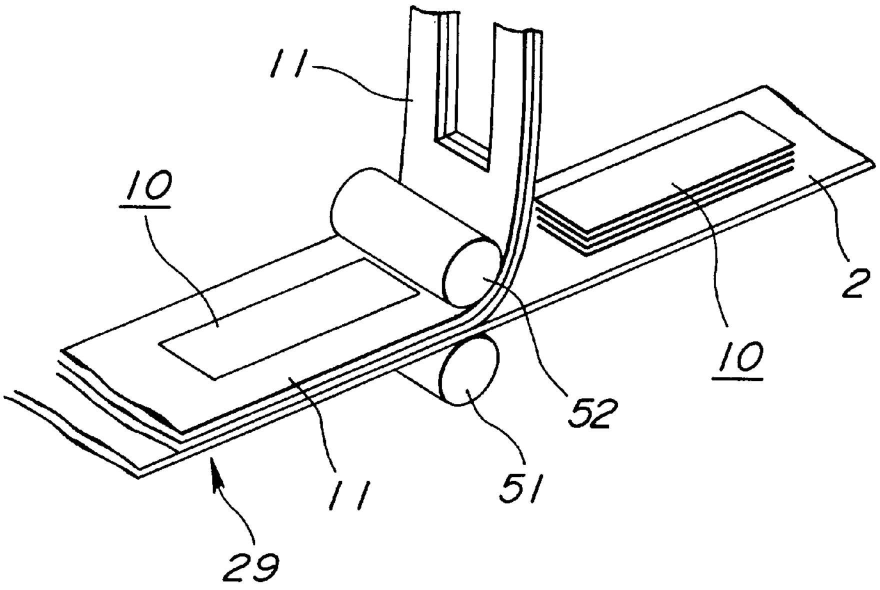
FIG. 4 is an explanatory view of a step of taking up a blank sheet left after punching out a display label portion from a laminate.

Accordingly, the laminate 29 is punched to the predetermined shape by the first punch 42 while leaving intact the amount of thickness of the release sheet 2, whereby a the display label portion 10 having a flat shape equal to that of the display label 1 is formed as shown in FIG. 4. Further, along with this, the laminate sheet material in the laminate 29 other than the display label portion 10 becomes the blank sheet 11.

Subsequently, the display label producing machine 30 takes up the blank sheet 11 by sending the laminate 29 to the blank sheet take up mechanism 50. The blank sheet tape up mechanism 50 is provided with a pair of nipping rollers 51 and 52 and a blank sheet take up roller 53. As shown in FIG. 4, the blank sheet 11 in the laminate 29 passing the nipping rollers 51 and 52 is taken up by the blank sheet take up roller 53. At this time, in the laminate 29, the label pieces are punched by the label shape punching mechanism 40 while the release sheet 2 is not punched, therefore the entire release sheet 2 and the display label portion 10 remain in the feed line and only the blank sheet 11 is taken up and removed from the feed line. The display label portion 10 remaining on this release sheet 2 is sent to the label sheet division mechanism 60.

Figure 5:
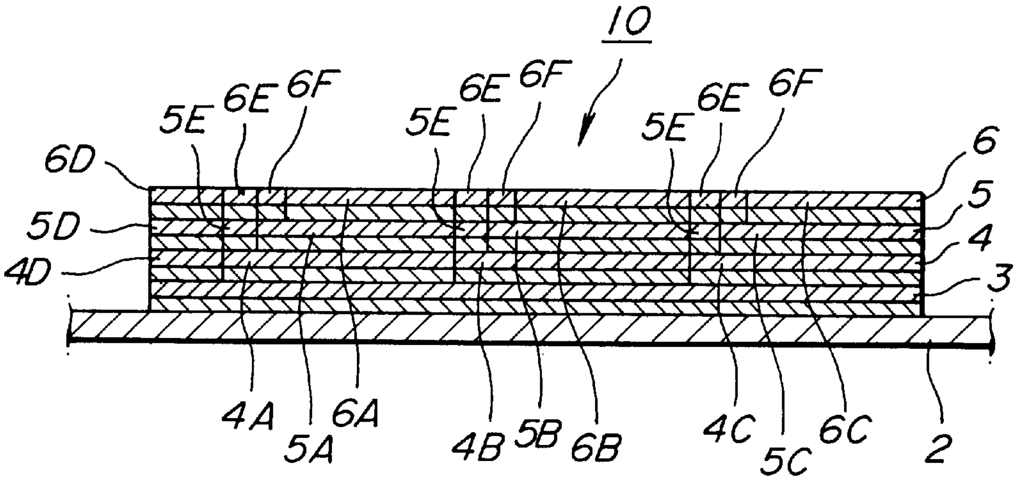
FIG. 5 is a sectional view of the display label portion at the point of time when a label sheet dividing step is ended.

This label sheet division mechanism 60 is provided with a base stand 61 and a second punch 62. The label sheet material of the display label portion 10 is divided by them to form the label pieces of the laminated divided label members 4, 5, and 6 constituting the display label 1. This second punch 62 is numerically controlled to the correct depth of cut. The display label portion 10 sent onto the base stand 61 is cut at the predetermined positions by the second punch 62, whereby, as shown in FIG. 5, laminated divided label members 4, 5, and 6 divided into label pieces 4A, 4B, 4C, 5A, 5B, 5C, 6A, 6B, and 6C are formed. Further, by this step, a plurality of cuts are formed in the display label portion 10, so the label pieces are able to be separated from each other. At the same time, the label scraps 4D, 5D, 6D, 5E, 6E, and 6F not constituting parts of the display label 1 are generated. The display label portion 10 and the release sheet 2 are sent to the label scrap removing mechanism 70 while being guided through the traveling path by a sprocket roller 63 as shown in FIG. 3.

This label scrap removing mechanism 70 is constituted by, as shown in FIG. 3, a guide roller 72 for bending the release sheet 2 and the display label portion 10, an adhesive tape 73 for removing the label scraps from the display label portion 10, an adhesive tape attachment roller 74 for attaching this adhesive tape 73, an adhesive tape take up roller 75 for taking up the adhesive tape 73, a guide member 76 for pushing the adhesive tape 73 against the label scraps, and an actuator 77 for driving this guide member 76.

The adhesive tape 73 has an adhesive surface 78 having a relatively high adhesive strength and is wound around the adhesive tape attachment roller 74 with the adhesive surface 78 facing the outside. On the other hand, in the guide member 76, a pressing portion 76A having an acute cross-section is formed at the front end thereof. This pressing portion 76A is driven by the actuator 77 so as to perform reciprocal movement in an AB direction of FIG. 6 toward the center of the guide roller 72. The adhesive tape 73 is folded back at the pressing portion 76A of the guide member 76 with the adhesive surface 78 on the outside as shown in FIG. 6 and arranged so that the front end is taken up by the adhesive tape take up roller 75.

Figure 6:
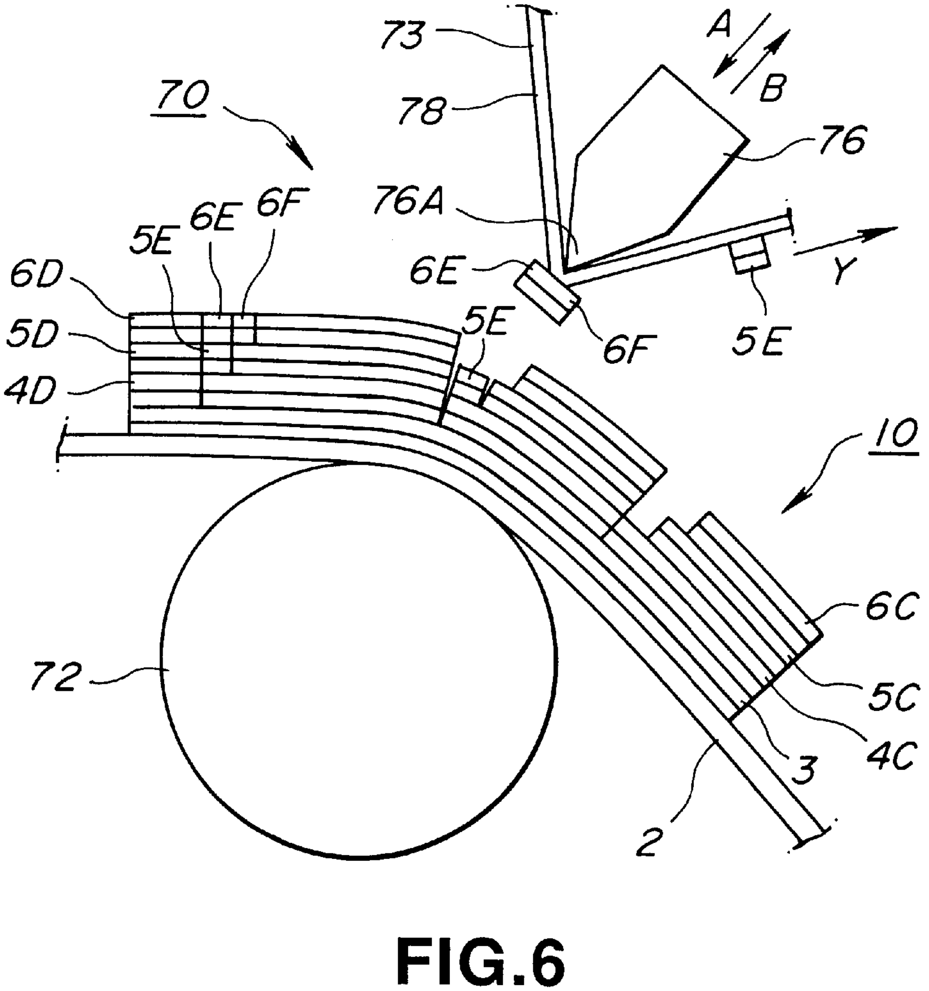
FIG. 6 is an explanatory view of a label scrap removing step for removing the label scrap from the display label portion.

The display label portion 10 on the release sheet 2 is bent at a predetermined angle along the circumferential face of the guide roller 72, whereby the cuts are opened and clearances are formed as shown in FIG. 6 so that the side portions of the label scraps separate from the label pieces on the two sides thereof.

In this state, the label scrap removing mechanism 70 moves the guide member 76 in an A-direction of FIG. 6, whereby the adhesive surface 78 of the adhesive tape 73 is pushed against the surface of the label scraps of the display label portion 10 located at this bent point. Then, by the movement of the guide member 76 in a B-direction of FIG. 6 from this state, the label scrap removing mechanism 70 easily detaches the label scraps pushed against the adhesive surface 78 from the display label portion 10.

The label scrap removing mechanism 70 takes up the adhesive tape 73 by the adhesive tape take up roller 75 and move it in a Y-direction of FIG. 6, whereby a new adhesive surface 78 appears at the position of the pressing portion 76A of the guide member 76. Below, similarly, the label scraps are removed from the display label member portion 10. In this way, after removal of all label scraps, the display label 1 shown in FIG. 1 is formed on the release sheet 2.

Then, the display label producing machine 30 sends the display label 1 to the release sheet cutting mechanism 80 together with the release sheet 2. The release sheet cutting mechanism 80 is provided with a base stand 81, a cutter receiving base stand 82, and a cutter 83. The release sheet cutting mechanism 80 cuts the release sheet 2 to pieces each having a predetermined length by the cutter 83 to separate the individual display labels 1. The display labels 1 are placed on a display label cart 85 and moved to the packing line.

As explained in detail above, in the display label according to the present invention, by dividing the label members laminated on the first label member into separate pieces, when part of the recorded content is changed, it is sufficient to just peel off the label piece on which the title which should be changed is written, therefore it is possible to deal with a change of part of the titles smoothly with requiring useless labor.

Further, according to the method of production of the display label according to the present invention, the display label according to the present invention can be produced easily and without delay by a series of simple steps.

What is claimed is:

1. A multiple layer display label for displaying recorded contents to be adhered to a housing accommodating an audio, video, data, or other information recording medium, comprising:

a release sheet having a silicone-based coating on a coating surface of the release sheet;

a mount sheet having an adhesive agent on a first surface of the mount sheet, wherein the adhesive agent adheres to the coating surface of the release sheet, the mount sheet having an area commensurate with an adhesion surface of the housing;

a first label member laminated on the mount sheet, the first label member being smaller than the mount sheet when respective ends of the mount sheet and the first label member are aligned, wherein the first label member is a separable member that may be selectively divided into a plurality of pieces, and which has an adhesive agent on a first surface such that the adhesive agent serves to laminate the first label member to a second surface of the mount sheet;

a second label member laminated on the first label member, the second label member having a plurality of pieces which are smaller than the pieces of the first label when respective ends of the first label member and the second label member are aligned, and an adhesive agent on a first surface such that the adhesive agent serves to laminate the second label member to a second surface of the first label member; and a pre-determined number of third to nth label members, each of the third to nth label members having adhesive agents on a first surface that serve to laminate the third to nth label members to a second surface of the second to nth−1 label members, respectively, wherein the third to nth label members are comprised of a plurality of pieces which are smaller than the pieces of the second to nth−1 label members, respectively when respective ends of the second to nth−1 label members and the third to nth label members are aligned, wherein the adhesive agents coated on the surfaces of the mount sheet and the label members have peeling strengths per unit area which are gradually smaller from the mount sheet toward the third to the nth label members.

2. A multiple layer display label as set forth in claim 1, wherein the stepwise exposed ends of the mount sheet and successive label members are constructed of different colors at least between adjoining label members.

* * * * *